United States Patent [19]

Garimella

[11] Patent Number: 5,289,698
[45] Date of Patent: Mar. 1, 1994

[54] MODULAR NESTED VAPOR COMPRESSION HEAT PUMP FOR AUTOMOTIVE APPLICATIONS

[75] Inventor: Srinivas Garimella, Williamsville, N.Y.

[73] Assignee: General Motors Corporation, Detroit, Mich.

[21] Appl. No.: 944,372

[22] Filed: Sep. 14, 1992

[51] Int. Cl.⁵ .................. F25B 1/00; B60H 1/32
[52] U.S. Cl. .................... 62/498; 62/325; 62/239; 62/243; 62/244
[58] Field of Search ............ 62/498, 325, 239, 243, 62/244

[56] References Cited

U.S. PATENT DOCUMENTS

| | | | |
|---|---|---|---|
| 4,248,056 | 2/1981 | Beacham | 62/238 E |
| 4,297,855 | 11/1981 | McCarty et al. | 62/325 |
| 4,305,260 | 12/1981 | Backlund | 62/325 X |
| 4,307,575 | 12/1981 | Popinski | 62/244 X |
| 4,448,347 | 5/1984 | Dunstan | 237/2 B |
| 4,510,762 | 4/1985 | Richarts | 62/325 X |
| 4,566,531 | 1/1986 | Stolz | 62/325 X |
| 4,653,287 | 3/1987 | Martin et al. | 62/325 X |
| 4,809,521 | 3/1989 | Mokadam | 62/498 |

FOREIGN PATENT DOCUMENTS

| | | |
|---|---|---|
| 103682 | 4/1938 | Australia. |
| 3042983 | 9/1982 | Fed. Rep. of Germany. |
| 0178913 | 11/1982 | Japan ................................ 62/325 |

OTHER PUBLICATIONS

"Electrical West" Apr. 1, 1931, vol. 66, No. 4, p. 178.

Primary Examiner—Henry A. Bennett
Assistant Examiner—Christopher B. Kilner
Attorney, Agent, or Firm—Patrick M. Griffin

[57] ABSTRACT

A heat pump for a vehicle includes a compressor helically wound with two pairs of concentric tubes forming the condenser and evaporator. One of the tubes of each pair is in fluid communication with glycol solution used as a heat transfer medium, and the other communicates the refrigerant. The first pair of concentric tubes operates as the condenser and produces condensed refrigerant to an expansion device. The evaporator comprises the second pair of concentric tubes and receives the expanded refrigerant for evaporating same. The glycol solution is communicated to air coupled heat exchangers to heat or cool the passenger compartment, depending on the vehicle mode.

2 Claims, 2 Drawing Sheets

MODULAR NESTED VAPOR COMPRESSION HEAT PUMP FOR AUTOMOTIVE APPLICATIONS

TECHNICAL FIELD

The invention relates to heat pump systems utilized in vehicles for cooling and heating the passenger compartment, and more particularly to hydronically coupled heat pump systems.

BACKGROUND OF THE INVENTION

Passenger compartment heating and cooling are provided in most automobiles. In internal combustion engines of automobiles, an engine driven compressor runs a vapor compression air conditioning system for summer operation. In the winter, waste heat of combustion is used for heating the passenger compartment. In future vehicles designed to decrease automobile emissions, the source of propulsion energy is commonly an electric storage device, such as a battery. The amount of energy that can be stored in the currently available battery is limited, therefore there is a need to minimize the use of stored energy for other uses such as passenger thermal comfort.

Present air conditioning systems in vehicles are air-coupled, i.e., the condenser is cooled by air and the evaporator is heated by air. Because the passenger compartment needs to be heated in the winter and cooled in the summer, the heat exchanger located in a heating, ventilating and air conditioning (HVAC) module should operate as an evaporator in the summer and a condenser in the winter. Similarly, the heat exchanger located at the front end should operate as an evaporator in the winter and a condenser in the summer. This necessitates the reversal of the flow of refrigerants through the system. Furthermore, due to the close coupling of the refrigerant circuit and the respective air streams, there is no flexibility in the location of the heat exchangers. In other words, one of the refrigerant heat exchangers must necessarily be at the front end to interact with ram air, while the other must be in the HVAC module.

Electronic heat exchange systems are known outside of the application of vehicles. One such system is disclosed in U.S. Pat. No. 4,248,056 issued Feb. 3, 1981 in the name of Beacham. The patent discloses a heat reclaimer for a heat pump. The heat reclaimer is coiled about the condenser in heat transfer relationship therewith and absorbs heat from the compressor by circulating cooling fluid therethrough. The reclaiming circuit is connected into a fluid circulating loop which is used to supply heat to the evaporator coil of the heat pump.

German patent no. 3042983 issued Sep. 30, 1982 discloses a hot water tank for a heat pump which contains two double walled condenser coils with hot water passing through the inner tubes. Within the hot water tank, there are two condensers consisting of a double walled tube wound into a coil. The inner tube is connected to the hot water supply line halfway up the tank and discharges through a vertical tube inside the tank with one branch connected to the top of the bottom coil and a second branch discharging into the bottom of the tank.

The problem with the prior art, is that it is not readily nor efficiently adaptable to vehicle heat exchange systems for heating and cooling a passenger compartment.

SUMMARY OF THE INVENTION AND ADVANTAGES

The invention is a heat pump apparatus for use in a vehicle of the type utilizing a compressor for compressing refrigerant. The apparatus includes the compressor for compressing refrigerant and having a suction pipe for receiving evaporated refrigerant and a discharge pipe for supplying compressed refrigerant. Also included is condenser means arranged circumferentially about the compressor for receiving and condensing the compressed refrigerant and for producing condensed refrigerant. Expansion means receives and expands the condensed refrigerant and produces two-phase refrigerant. Evaporator means is arranged circumferentially about the compressor and spaced from the condenser means for receiving and evaporating the two-phase refrigerant and for producing the evaporated refrigerant.

The condenser means comprises a pair of concentric tubes helically wound about the compressor for receiving and condensing the compressed refrigerant with a first of the concentric tubes, and for receiving and allowing flow of a heat exchange liquid, such as glycol, through the second of the concentric tubes. The evaporator means is similarly configured.

BRIEF DESCRIPTION OF THE DRAWINGS

Advantages of the present invention will be readily appreciated as the following description is taken in conjunction with the drawings wherein.

DESCRIPTION OF THE PREFERRED EMBODIMENT

Figure 1:
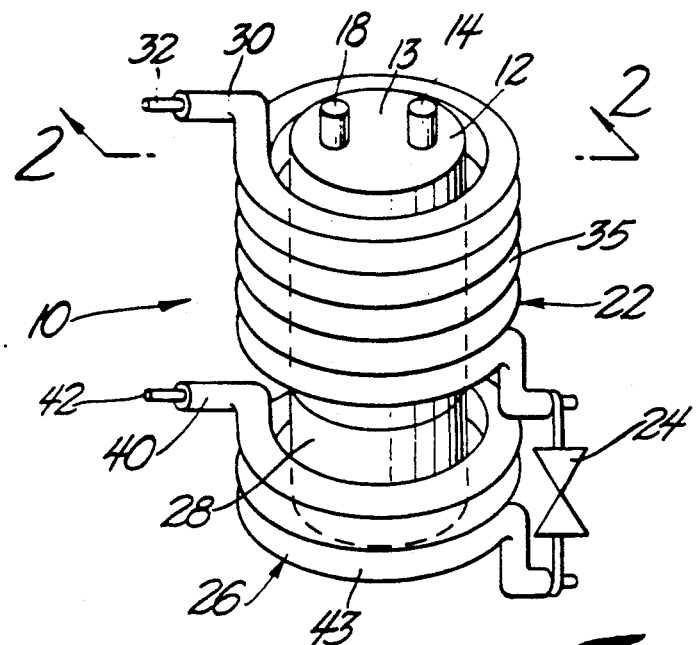
FIG. 1 is a perspective view of the subject invention.

A heat pump apparatus for use in a vehicle is generally illustrated at 10 in FIG. 1. The heat pump apparatus 10 is hydronically coupled through counterflow heat exchangers. Typical automotive air-coupled condensers and evaporators are air-coupled cross-flow devices. Counterflow heat transfer using a liquid medium is more effective than cross-flow heat transfer resulting in more effective and therefore smaller heat exchangers.

The heat pump apparatus 10 includes a compressor 12 for compressing refrigerant and producing compressed refrigerant. The compressor 12 includes a suction pipe 14 for receiving evaporated refrigerant from a conduit line 16. The compressor 12 also includes a discharge pipe 18 for supplying compressed refrigerant to a conduit line 20. The compressor 12 may be of the type commonly found in present vehicle applications of an HVAC module in an electric vehicle. As such, the compressor typically has a generally cylindrical outer housing. The compressor 12, as commonly known in the art, includes an electric drive motor 28 connected therein within a common housing.

The heat pump apparatus 10 also includes condenser means 22, expansion means 24, and evaporator means 26, whose general functions are commonly known in the art. The condenser means 22 is circumferentially located about the compressor 12 for receiving and condensing the compressed refrigerant and for producing condensed high pressure liquid refrigerant. The expansion means 24 receives and expands the condensed refrigerant for producing two phase refrigerant. Lastly, the evaporator means 26 is arranged circumferentially about the compressor 12 and spaced from the condenser means 22 for receiving and evaporating the two phase refrigerant and for producing evaporated low pressure vapor refrigerant which is in turn fed to the suction pipe 14 of the compressor 12.

Figure 2:
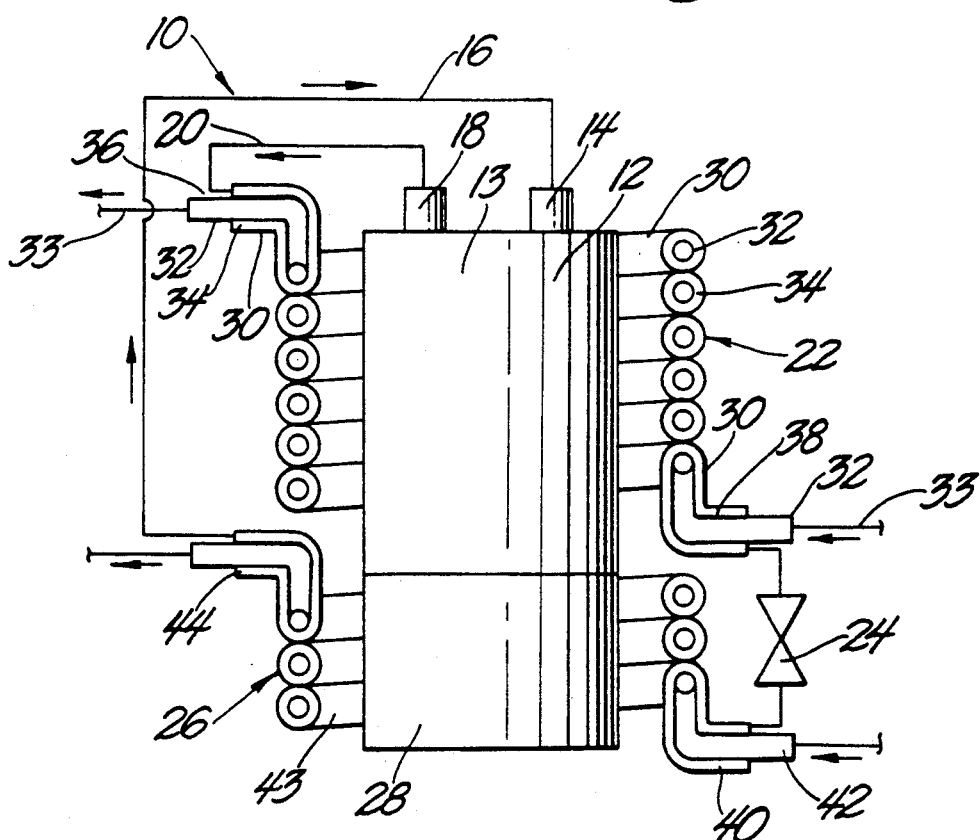
FIG. 2 is a cross-sectional view of the subject invention taken along line 2—2 of FIG. 1.

The condenser means 22 comprises a first pair of concentric tubes 30,32 helically wound about the compressor 12 for receiving and condensing the compressed refrigerant and producing the condensed refrigerant from a first tube 30 of the pair of concentric tubes, and for receiving and allowing the flow therethrough of a heat exchange liquid 33 in the second tube 32 of the first pair of concentric tubes. In other words, the compressed refrigerant exiting the compressor 12 at the discharge pipe 18 is discharged into a coiled tube-in-tube 30,32 condenser 22 cooled by the heat exchange liquid 33. As illustrated in FIG. 2, the heat exchange liquid is shown flowing through the second or inner tube 32 of the condenser 22 and the refrigerant flows through the first tube 30 in an annulus 34 formed between the two tubes 30,31. The ducting or flow through of the specific tubes may be switched as desired for specific applications. In a preferred embodiment, six coils 35 of the concentric tubes 30,32 are helically wound about the compressor 12 in side-by-side contacting relationship from a first end 13 thereof, longitudinally along the compressor 12.

In the preferred embodiment, the heat exchange liquid comprises a glycol solution 33 which flows through the concentric tubes 30,32. A first end 36 of the concentric tubes 30,32 receives the compressed refrigerant from the discharge line 20 in the annulus portion 34, and produces at a second end 38 of the concentric tubes 30,32 the condensed refrigerant to supply same to the expansion means 24. The second end 38 of the concentric tubes 30,32 receives the glycol solution within the second tube 32 isolated from the refrigerant flowing within the annulus 34, and dispenses the glycol 33 at the first end 36 thereof. Depending on the specific application, the fluid flow through the inner tube 32 and the annulus 34 can be switched, i.e., glycol solution 33 could flow through the annulus 34, and refrigerant from the discharge line 20 could flow through the inner tube 32.

The expansion means 24 comprises an expansion device as commonly known in the art of heat exchanger systems of vehicles. The expansion device 24 receives and expands the condensed refrigerant to produce a two-phase refrigerant i.e., liquid and gas. The two-phase refrigerant is received by the evaporator means 26.

The evaporator means 26 comprises a second pair of concentric tubes 40,42 helically wound about the compressor 12 and spaced longitudinally from the condenser 22 for receiving and evaporating refrigerant in the evaporator means 26. The two-phase refrigerant is received at a first tube 40 of the second pair of concentric tubes 40,42, and the heat exchange liquid, i.e., glycol, which is part of a second heat exchange loop, is received in the second tube 42 of the second pair of concentric tubes 40,42. The configuration of the evaporator 26 is similar to that of the condenser 22 with respect to the tube-in-tube configuration and the flow of glycol solution through the inner or second tube 42 and the flow of refrigerant in an annulus 44 formed between the first tube 40 and the second tube 42. In the evaporator 26, there are three layers of coils 43 which are spaced from the condenser coils 35 and are helically wound side by side about the compressor 12. It is to be understood that any number of layer coils 35,43 can be used depending on heat load. Specifically, the evaporator coils 43 are wound about the portion of the compressor 12 containing the motor 28. The evaporated refrigerant flows back to the compressor 12 through the suction line 16 to the suction pipe 14. Depending on the specific application, the flow through the inner tube 42 and the annulus 44 can be switched, i.e., glycol solution could flow through the annulus 44, and the refrigerant from the expansion means 24 could flow through the inner tube 42.

Though the Figures illustrate the tubes 30,32,40,42 by a single line, it is to be understood that the tube construction is of common two walled tubing providing a thickness therebetween.

Figure 3:
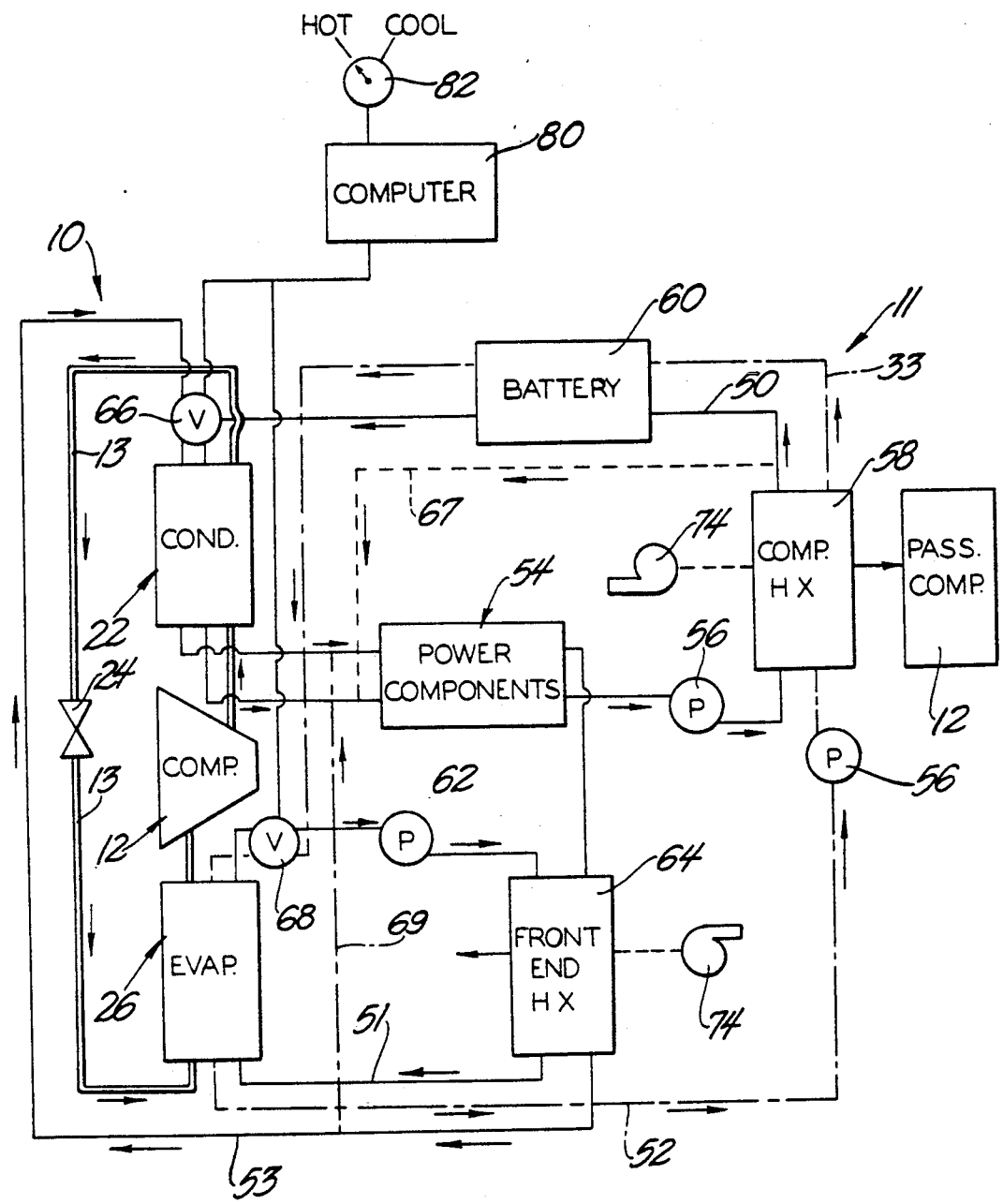
FIG. 3 is a schematic diagram of the subject invention applied to a vehicle heating and cooling system.

As schematically illustrated in FIG. 3, the refrigerant 13 flows in the same direction through the heat pump 10 both in heating and cooling modes. There is no reversal of flow as required in the prior art systems thus eliminating the weight and expense of a refrigerant reversing valve and its fittings as found in pre-existing heat pump systems for heating and cooling vehicles. The flow of refrigerant 13 is indicated by double solid lines with arrows in FIG. 3. The evaporator 26 and condenser 22 act according to their respective functions at all times. Accordingly, they can be designed to have maximum efficiency at all times. In pre-existing heat pump systems, on the other hand, the heat exchanger that functions as a condenser in the summer has to function as an evaporator in the winter, and vice versa. This results in non-optimal heat exchanger design.

The heat pump apparatus includes a temperature control system 11 which includes a combination of four glycol loops 50, 51, 52, 53 flowing in various routes through the condenser 22 and evaporator 26 and vehicle, as shown in FIG. 3. Depending upon whether cooling or heating is required the specific glycol loops 50, 51, 52, 53 are connected to flow in opposite directions through the condenser 22 and evaporator 26 as will be explained in greater detail. The control system 11 is discussed in co-pending patent application HYDRONICALLY COUPLED INTEGRATED HEAT PUMP AND SUPPLEMENTAL HEAT RECOVERY SYSTEM FOR MOBILE APPLICATIONS, and is incorporated by reference herein.

Commonly available tubing may be utilized for communicating the glycol in the loops 50, 51, 52, 53 with suitable valving connected to accomplish switching of the loops depending on the selection of heating or cooling mode.

The glycol 33 is sent through a passenger compartment air coupled heat exchanger 58 for heat transfer with the air to provide cooling or heating of the air to the passenger compartment 12 depending on the temperature of the glycol. The air coupled, cross-flow heat exchanger 58 is of the type commonly known in the art for directing ambient air through an air flow core 58a across tubes 58b containing the fluid solution.

The method of the present invention includes a heating mode in which a compartment heating glycol loop 50 (solid line) is connected and utilized in the condenser 24 as shown in FIG. 3. The heated glycol from the condenser 22 is communicated through passages 54a in heat transfer relationship with the power components 54 of the vehicle, e.g., invertor, electric drive motor and other powered accessories for further heating of the glycol. The glycol is circulated in the loop 50 by a pump 56 which draws glycol from passages 54a to discharge through the compartment air coupled heat exchanger 58 for providing temperature controlled (heated) air flow using a blower 74 to the passenger compartment 12. The glycol solution is thereafter sent through a passage 60a in heat transfer relationship with the battery 60 for preheating of the glycol solution prior to communication with the condenser 22. The glycol flowing over the battery 60 obtains supplemental heat therefrom. The supplemental heat from the battery 60 and power components 54 is conductively transferred to the glycol by placing same in contact therewith, i.e., the glycol flows about a portion of the battery 60 housing and through housings for the power components 54.

A second glycol loop 51 is utilized during the heating mode to heat the evaporator 26. The second glycol loop 51 includes a pump 62 for pumping the glycol within the loop 51 between the evaporator 26 and a front end heat exchanger 64. The front end heat exchanger 64 is air coupled and is generally located at the front of the vehicle in the engine compartment thereof. The ambient air flow either produced by forward vehicle velocity or by an auxiliary fan rejects heat to the glycol in the front end heat exchanger 64, and the heated glycol flows through the evaporator 26 and evaporates the refrigerant in the annulus 44 formed within the illustrated three layers of coils 43 for return flow as low pressure refrigerant vapor back to the suction pipe 18.

The method further includes a cooling mode for summer or hot weather operation. In this mode, the glycol fluid flow connections (dash-dot lines) are switched by valves 66 and 68, and the glycol flows in the third and fourth glycol loops 52, 53 as shown in FIG. 3. In the third or passenger cooling loop 52, the glycol flowing through the evaporator 26 is directed to the compartment heat exchanger 58 by pump 56 for cooling the ambient air flowing thereacross. Thereafter, the glycol is sent through the battery 60 (battery 60 is precooled) for precooling of the glycol. The glycol is then returned to the evaporator 26 where it rejects heat to the refrigerant in the evaporator 26. The cold glycol flows back to the passenger compartment heat exchanger 58 where it cools the air blowing into the passenger compartment 12. The fourth or condenser cooling loop 53 connects the glycol flowing through the condenser 22 to the front end heat exchanger 64 via pump 62. After the glycol flows through the condenser 22 where it receives the heat of condensation, the glycol removes waste heat from the power components 54 and flows to the front end exchanger 64, and back to the condenser 22. Heat is rejected to the ambient air in the front end heat exchanger 64. The pump 56 is diagrammatically shown in loops 50, 52 with it being understood that cross-over connections to accomplish the interposition of pump 56 in one or the other of the loops is omitted for simplification of the diagram. Likewise pump 62 is shown in loops 51 and 53 in a like manner, also to simplify the diagram.

In situations where the power component temperature surge is very high, i.e., exceeds predetermined temperature set points for such components, the air conditioning system can be momentarily switched off and the refrigerant can be directed by valves (not shown) to bypass the condenser 22 as indicated by line 66 in heating mode. A surge protection line 69 is also provided with suitable valving (not shown) to bypass the condenser 22 during the mode under similar out-of-limit conditions.

Therefore, transfer of heat to or from the passenger compartment 12 and to or from the ambient air is achieved by coupling the glycol flowing through the condenser 22 and the evaporator 26 to the ambient and passenger compartment air using air-glycol heat exchangers 64, 58 respectively. Their respective glycol loops 50-53 accomplish supplemental heat transfer with the battery 60 and power components 54.

The connection of the glycol loops 50-53 and lines 67, 69 can be controlled by the vehicle computer 80 in conjunction with valves 66 and 68 controlled thereby in accordance with a mode selector switch 82.

The heat pump apparatus 10 has been used to accomplish passenger comfort in both summer and winter. In the winter, the heat pump 10 is especially attractive because it has a coefficient of performance that can be as high as 3. This means for that every BTU/hour of heat input to the system, the passenger can be supplied up to three BTU/hour (the remaining two BTU/hour being drawn from the ambient). This high coefficient of performance helps to reduce the vehicle range penalty incurred by providing a heating system for an electrical car.

As an example, a 0.625 inch outer diameter tube 42, 32 was utilized for the inner tube of the evaporator 26 and the condenser 22 having a wall thickness of 0.035 inches. The outer diameter of the outer tube 40,30 of the evaporator 26 and the condenser 22, was 1.00 inch with a wall thickness of 0.035 inches.

The invention also includes a method of making and operating a heat pump 10. The method includes the steps of coiling the first pair of concentric tubes 30,32 about the compressor 12 in a plurality of layers longitudinally along the compressor 12 forming the condenser 22, coiling the second pair of concentric tubes 40,42 about the motor portion 28 of the compressor 12 spaced from the condenser 22 in a similar manner thereof forming the evaporator 26, directing heat exchange fluid (glycol) through the inner or second tubes 32,42 of the condenser 22 and evaporator 26, directing refrigerant from the compressor 12 through the annulus 34 or first tube 30 of the condenser 22 producing condensed refrigerant, directing the condensed refrigerant from the annulus 34 to the expansion device 24 producing two-phase refrigerant, directing the two-phase refrigerant through the annulus 44 or first tube 40 of the evaporator 26 producing evaporated refrigerant, and directing the evaporated refrigerant to the compressor 12.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A heat pump apparatus hydronically coupled for use in a vehicle, said apparatus comprising:
   a compressor for compressing refrigerant and having a suction pipe for receiving evaporated refrigerant and a discharge pipe for supplying compressed refrigerant;

condenser means comprising a first pair of concentric tubes helically wound about said compressor for receiving and condensing said compressed refrigerant and producing condensed refrigerant from a first of said first pair of concentric tubes, and for receiving and allowing flow through of a heat exchange liquid in a second of said first pair of concentric tubes;

evaporator means comprising a second pair of concentric tubes helically wound about said compressor and spaced therefrom for receiving and evaporating refrigerant from said condenser means and for producing said evaporated refrigerant at a first of said second pair of concentric tubes, and for receiving and allowing flow through of a heat exchange liquid in a second of said second pair of concentric tubes.

2. A heat pump apparatus for use in a vehicle, said apparatus comprising:

a compressor for compressing refrigerant and having a suction pipe for receiving evaporated refrigerant and a discharge pipe for supplying compressed refrigerant;

condenser means formed circumferentially about said compressor for receiving said compressed refrigerant and a heat exchange liquid for condensing said compressed refrigerant and for producing condensed refrigerant;

expansion means for receiving and expanding said condensed refrigerant and for producing two-phase refrigerant;

evaporator means formed circumferentially about said compressor and spaced from said condenser means for receiving said two-phase refrigerant and a heat exchange liquid for evaporating said two-phase refrigerant and for producing said evaporated refrigerant;

said heat exchange liquid comprising a glycol solution.

* * * * *